Dec. 25, 1962    E. MIVILLE    3,070,316
SOAP AND WATER MIXING VALVE
Filed June 16, 1961    3 Sheets-Sheet 1

INVENTOR
Edouard MIVILLE
BY
ATTORNEYS

Dec. 25, 1962  E. MIVILLE  3,070,316
SOAP AND WATER MIXING VALVE
Filed June 16, 1961  3 Sheets-Sheet 3

INVENTOR
Edouard MIVILLE
BY
ATTORNEYS

United States Patent Office 3,070,316
Patented Dec. 25, 1962

3,070,316
SOAP AND WATER MIXING VALVE
Edouard Miville, 198 Arago St. E., Apt. 37,
Quebec 2, Quebec, Canada
Filed June 16, 1961, Ser. No. 117,545
1 Claim. (Cl. 239—312)

The instant invention pertains to a mixing valve and more particularly to a valve for mixing water and soap and in particular use, although not restrictively so, in washrooms.

One object of the invention is to provide a device which will automatically mix the water and the soap so that handling of the soap itself by the user will not be necessary.

Another object of the invention lies in the provision of a mixing valve of the aforesaid type which includes means whereby the water and the soap are thoroughly mixed before leaving the valve.

A further object of the invention consists in the provision of a mixing valve which will create a foamy type of soap water similar to that obtained with powdered soap when used in a washing machine where the foam is obtained by the vigorous action of the washing machine impeller.

A still further object of the invention resides in the provision of a mixing valve which will not only mix water and soap but which is also provided with means to control the temperature of the water.

The aforesaid objects are obtained with the valve of the invention which consists in the provision of a main container divided into two compartments or chambers. One of said compartments or chambers is adapted to receive a soap while the second compartment or chamber is meant for the mixing of the water and soap. An inlet for the water is provided at one end of this container opening into the soap compartment whereas the outlet is provided at the other end of the container and in the second compartment. By providing communication between said two compartments, water which flows from the inlet to the outlet is forced around the soap to dissolve part of it, then flows on into the mixing chamber before finally reaching the outlet.

Further objects and advantages of the invention will be afforded by the following description of a non-limitative example of the invention, having regard to the appended drawings wherein:

FIG. 2 is also a perspective view of the invention but shown partly exploded,

Figure 1:
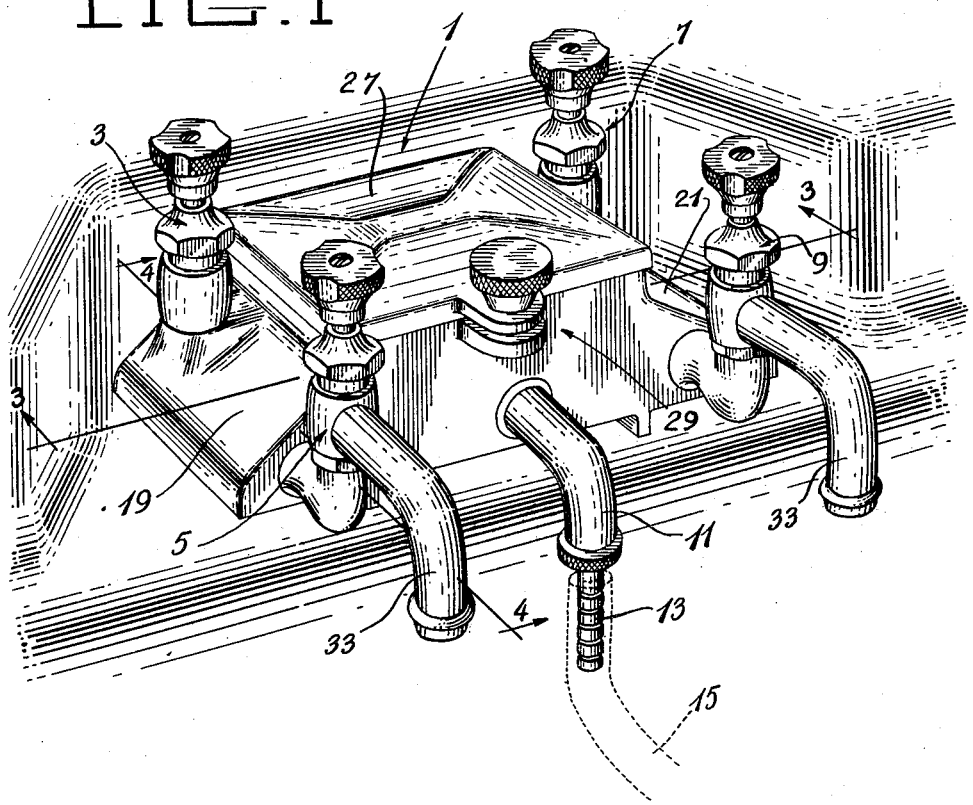
FIG. 1 is a full perspective view of the mixing valve of the invention.

FIG. 1 shows the invention as being composed of a main casing 1 into which are connected water faucets 3, 5, 7 and 9. Left hand faucets 3 and 5 would usually be hot water faucets, whereas, right hand faucets 7 and 9 would be cold water faucets. The casing is also provided with a suitable outlet pipe 11 to which may be attached a nipple 13 for the connection of a rubber hose 15.

Figure 3:
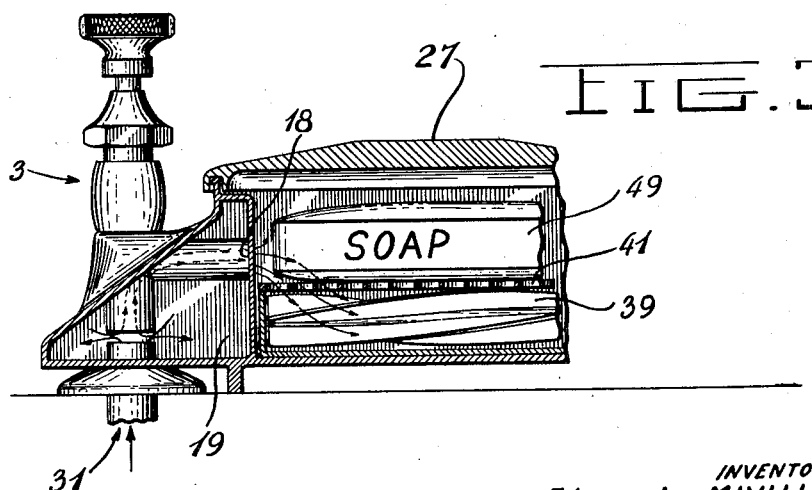
FIG. 3 is a section along line 3—3 of FIG. 1.
Figure 4:
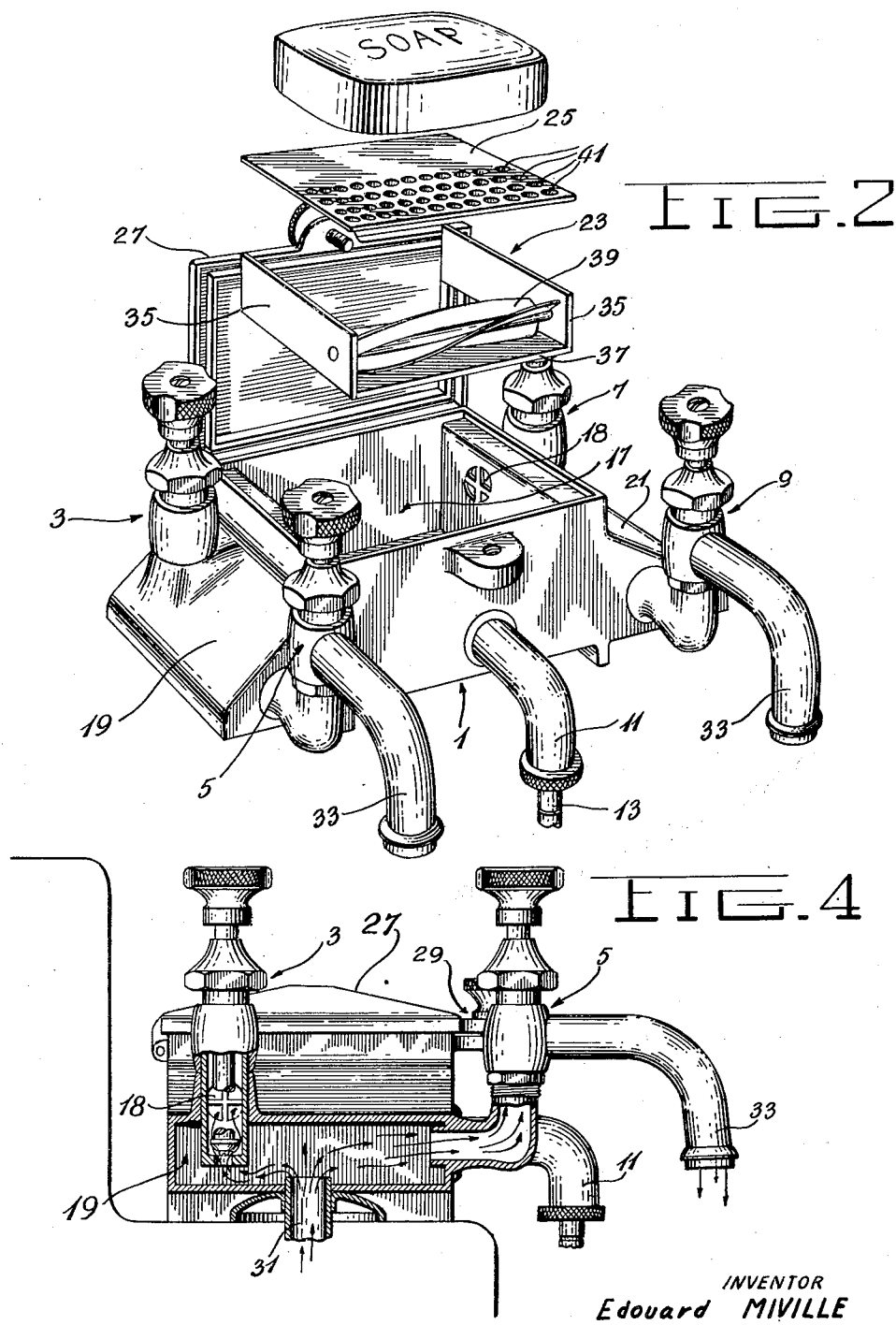
FIG. 4 is a section along line 4—4 of FIG. 1.
Figure 5:
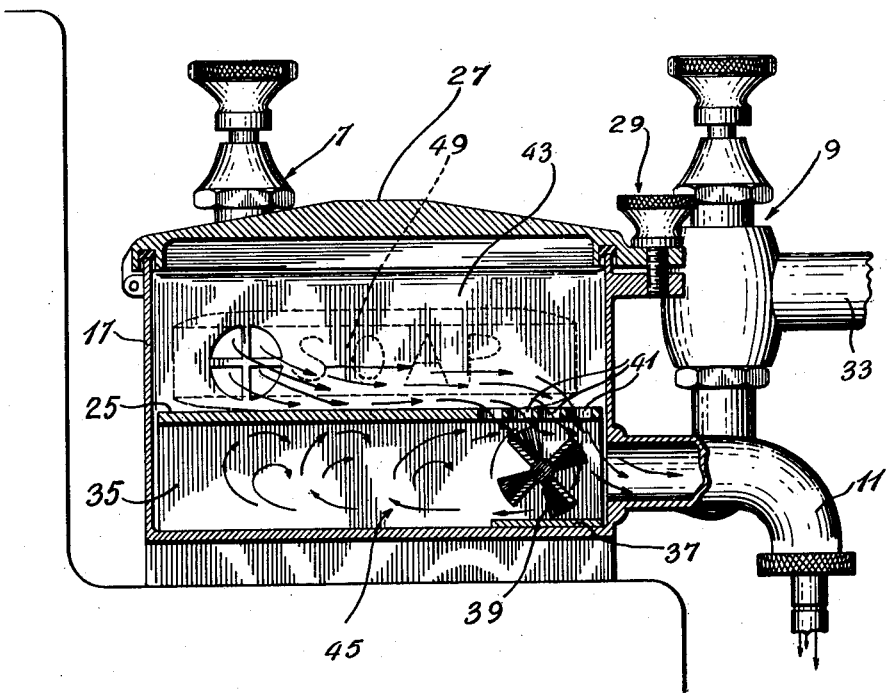
FIG. 5 is a transverse vertical cross-section of the valve.

FIG. 2 will readily show that casing 1 is formed of central container 17 provided, laterally thereof with a hot water plenum chamber 19 and a cold water plenum chamber 21, best seen in FIGURES 3 and 4. A turbine assembly 23 sits at the bottom of container 17 and a dividing plate or partition 25 rests over turbine assembly 23, as perhaps best seen in FIG. 5. Finally, a cover 27 which is hinged at one end, closes container 17 and is locked into position by means of a locking mechanism generally denoted by the numeral 29, FIGS. 1 and 5.

Ingress of hot and cold water is provided by means of pipes 31 connected to plenum chambers 19 and 21, actually only one being shown (FIGS. 3 and 4), that in communication with plenum chamber 19. It should be understood that the mixing valve is symmetrical so that plenum chamber 21 is identical to chamber 19 in all physical aspects.

As mentioned previously, two faucets control each of the cold and hot water. Faucets 5 and 9 act independently of container 17 and discharge directly through independent outlets 33. Water faucets 3 and 7 on the other hand control the flow of water into container 17 through apertures 18 as clearly indicated in FIGS. 2, 3 and 4.

Turbine assembly 23 consists of two lateral upstanding plates 35 held spaced apart by means of bottom brace plate 37. Between lateral plates 35 is rotatably mounted a turbine 39 formed of a series of helical blades wound around a common shaft. As mentioned above, the turbine assembly is set in the bottom of container 17 and is closed in by plate 25. The latter plate is provided with a series of apertures at the forward end thereof and is placed over turbine assembly 23 in such a way that these apertures 41 fall over the turbine.

Container 17 is thus divided into an upper water inlet compartment or chamber 43 and a lower mixing chamber or compartment 45. Finally, a soapy water outlet 11 is provided which opens into mixing chamber 45.

In use a soap 49 is disposed in the upper chamber 43 and if soapy or foamy water is desired, faucets 3 and 7 are opened until water of a suitable temperature is obtained. Water then flows from inlet pipes 31 into plenum chambers 19, 21 through faucets 3 and 7 into upper chamber 43. On its way to outlet 11, water is forced around the soap and will dissolve part of it before escaping through openings 41. As the water falls over turbine 39, it causes its rotation and part of it will be deflected into the mixing chamber 45. This will create a mixing current which will thoroughly mix the water and soap and will create the desired foam before reaching outlet 11.

Although a specific embodiment of the invention has been described, it should be understood that various modifications can be resorted to while remaining within the scope of the invention which should only be construed from the appended claim. For instance, it is possible to divide container 17 into compartments standing one next to the other on a horizontal level rather than having an upper and a lower chamber. It has been found however that the disposition and arrangement thus described gives particularly good results.

I claim:
A unitary faucet assembly comprising:
(a) a casing divided into a central chamber and two lateral hot and cold water chambers, respectively;
(b) a cold water inlet for said cold water chamber and a hot water inlet for said hot water chamber;
(c) communicating means between said central chamber and said lateral chambers, respectively;
(d) for each lateral chamber, a faucet for controlling inflow of water into said central chamber and another faucet for controlling outflow into a sink or the like on which said assembly is mounted; said last named faucet opening into a front wall of said casing;
(e) a soapy water outlet from said central chamber opening into said front wall;
(f) a soap holding and foaming assembly freely mounted within said central chamber and comprising:
(g) a freely rotatable turbine disposed across but spaced from said soapy water outlet and mounted on two lateral upstanding plates, and (h) a soap holding platform adapted to horizontally sit on the upper edges of said lateral upstanding plates; said platform having a number of apertures forwardly thereof located above said turbine.

References Cited in the file of this patent

UNITED STATES PATENTS

| 1,910,235 | Burkett | May 23, 1933 |
| 2,038,260 | Ash | Apr. 21, 1936 |
| 2,120,807 | Kundel | June 14, 1938 |
| 2,477,998 | McCowan | Aug. 2, 1949 |